United States Patent [19]

Hill et al.

[11] Patent Number: 5,257,290
[45] Date of Patent: Oct. 26, 1993

[54] TRANSMISSION LINE TERMINATION OF GUIDE-COMMUNICATIONS WIRE FOR GUIDED VEHICLES

[75] Inventors: Lawrence W. Hill, Arlington; Frederick W. Sarles, Lexington, both of Mass.

[73] Assignee: ComSource Systems Corporation, Hollis, N.H.

[21] Appl. No.: 309,272

[22] Filed: Feb. 10, 1989

Related U.S. Application Data

[60] Continuation-in-part of Ser. No. 708,109, May 28, 1991, which is a continuation of Ser. No. 115,245, Oct. 30, 1987, abandoned, which is a continuation-in-part of Ser. No. 846,924, Apr. 1, 1986, abandoned, which is a division of Ser. No. 586,863, Mar. 6, 1984, Pat. No. 4,597,082.

[51] Int. Cl.$^5$ ............................................. H04K 1/10
[52] U.S. Cl. ........................................ 375/38; 455/41; 379/55
[58] Field of Search ............. 180/167, 168; 333/22 R, 333/263; 340/310 R, 933, 941, 988; 364/424.02; 375/37, 38, 6; 379/55; 455/54, 55, 120, 41

[56] References Cited

U.S. PATENT DOCUMENTS

| | | | |
|---|---|---|---|
| 3,149,691 | 9/1964 | Snell et al. | 180/168 |
| 3,669,207 | 6/1972 | Fellgett et al. | 180/168 |
| 3,996,518 | 12/1976 | Halstead et al. | 455/41 |
| 3,996,555 | 12/1976 | Dow | 340/941 |
| 4,006,315 | 2/1977 | Halstead | 455/55 |
| 4,119,800 | 10/1978 | Girardi | 455/79 |
| 4,333,147 | 6/1982 | Regueiro et al. | 364/424.02 |
| 4,656,406 | 4/1987 | Houskamp | 180/167 |
| 4,791,570 | 12/1988 | Sherman et al. | 364/424.02 |
| 4,920,340 | 4/1990 | Mizuno | 340/933 |

*Primary Examiner*—Curtis Kuntz
*Assistant Examiner*—Young Tse
*Attorney, Agent, or Firm*—F. Eugene Davis, IV

[57] ABSTRACT

A system for digital communication over a wire lain along the path of guided vehicles to a modem and a loop driver, the modem providing high frequency signals and the loop driver providing low frequency control signals. Instead, the modem and the loop driver are connected to one end of the wire and the other end of the wire is connected through an impedance matching network to earth ground. The impedance matching network provides an impedance approximately equal to the impedance of the wire at the frequency of the high frequency signals. The impedance matching network may conveniently comprise an inductor (choke) in parallel with a capacitor connected between the end of the wire and earth ground and a plurality of resistors connected in parallel with said inductor and capacitor. The resistors are selectively clipped to eliminate the echo bringing the impedance of the impedance matching network to approximate equality with the impedance of the wire at the frequency of the high frequency signals. Alternatively, a single loop connected in the ordinary way to the modem and loop driver, may be cut to form two separate wires and two separate impedance networks provided one at each end of the wires to earth ground.

20 Claims, 3 Drawing Sheets

TRANSMISSION LINE TERMINATION OF GUIDE-COMMUNICATIONS WIRE FOR GUIDED VEHICLES

RELATED APPLICATIONS

This application is a continuation-in-part of U.S. application Ser. No. 07/708,109, filed May 28, 1991, which application is a WFC of U.S. application Ser. No. 07/115,245, filed Oct. 30, 1987, now abandoned, which application is a continuation-in-part of application Ser. No. 06/846,924 of Apr. 1, 1986, now abandoned, which is a divisional of application Ser. No. 06/586,863 of Mar. 6, 1984, now U.S. Pat. No. 4,597,082; the above applications and patent are incorporated herein by reference.

TECHNICAL FIELD

This invention relates to transmission line termination of guide-communications wire for guided vehicles. The application also relates to a transceiver system for communication over wires lain along the path of guided vehicles, to digital communication with wire guided vehicles, and to transceivers for multi-drop local area networks utilized to communicate with wire guided vehicles.

BACKGROUND ART

In the above-identified application, Ser. No. 07/115,245, filed Oct. 30, 1987, entitled; TRANSCEIVER SYSTEM FOR COMMUNICATION OVER WIRE LAID ALONG THE PATH OF GUIDED VEHICLES we disclosed how to connect a modem and a loop driver to a typical floor loop then in use for guided vehicles.

We have discovered that such floor loops typically exhibit one or more null positions at which the signals sent from the host modem is so low (or non-existent) that communications is impossible with the guided vehicle.

According to the prior art, the automated guided vehicle floor loop is a current loop conductor. That is, the two ends of the wire of the floor loop are connected to a loop driver and, if used, to a communications modem. In fact, the floor loop is better viewed as a transmission line sitting above a ground plane, surrounded by a dielectric which generates radiation losses and which also slows the propagation velocity below that of a simple conductor.

The recognition of this more accurate model has lead us to design our equipment differently than the prior art.

DISCLOSURE OF THE INVENTION

Our guidance tone generator and our communication modem drive the floor loop wire single ended, against earth ground.

We terminate the "far" end of the loop wire with an impedance matching network having the wire's characteristic impedance at our typical 230 KHz carrier frequency, in order to minimize reflections.

As long as a good earth ground is available, this eliminates the need to bring the "far" end of the wire to the same point as the start (it is conventionally brought physically back to the starting point to complete the current loop).

In special situations, for example long range, we can terminate the line to earth ground at a point other than its end, and drive it from both ends. This allows greater flexibility in laying out the pattern of wires in the floor, to reduce mutual interference between wires.

We employ the specilized coupling network disclosed in the above-identified U.S. application Ser. No. 07/115,245 to provide connection between the loop driver, the modem, and the guide wire.

Since prior art loop drivers cannot be grounded, we employ loop drivers designed to be grounded or employ prior art loop drivers and isolate them from the earth ground using an isolation transformer.

OBJECTS OF THE INVENTION

It is therefore an object of the invention to provide improved communication over a wire lain along the path of guided vehicles. Another object of the invention is to minimize echoes of transmissions along such wires. A further object of the invention is to eliminate nulls in communications signals along such wires.

Other objects of the invention will in part be obvious and will in part hereinafter.

The invention accordingly comprises the features of construction, several elements, the arrangement of parts, and choice of functions and signals which will be exemplified in the construction of the systems hereinafter set forth. The scope of the invention is indicated in the claims.

BRIEF DESCRIPTION OF THE DRAWINGS

For a fuller understanding of the nature and objects of the invention, reference should be had to the following detailed description taken in connection with the accompanying drawings, in which.

The same reference characters refer to the same elements throughout the several views of the drawings of this application and the above-identified application Ser. No. 07/115,245.

BEST MODE FOR CARRYING OUT THE INVENTION

Figure 1:
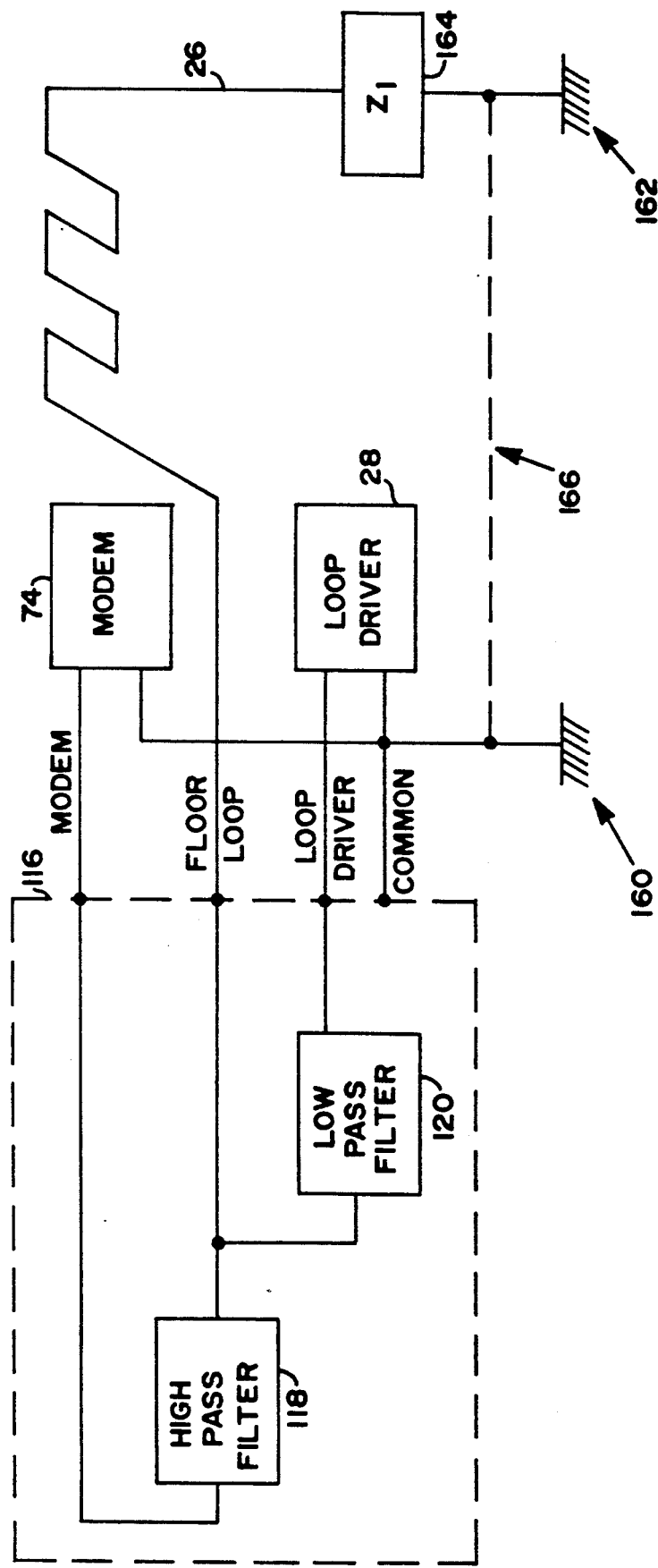
FIG. 1 is a schematic block circuit diagram of a system according to the invention.

A system according to the invention is shown schematiclly in FIG. 1. It comprises a loop driver 28 and modem 74 connected to coupling network 116 comprising high pass filter 118 and low pass filter 120 and a floor loop wire 26.

According to the invention, one terminal of each of the modem 74 and loop driver 28 are connected together and to earth ground as indicated at 160. As previously explained, the loop driver may include an isolation transformer or other appropriate design so that it can have one of its terminals grounded. The floor loop wire 26 is connected in circuit with the other terminals of the modem 74 and loop driver 28 via the coupling network 116. The other end of guidance and communications wire 26 is connected as indicated at 162 to earth ground by means of impedance matching network 164.

The impedance $Z_1$ of the impedance matching network 164 is adjusted to be approximately equal to that of the characteristic transmission line impedance of the wire 26 at the frequency of the signals provided on the modem 74. This may be conveniently accomplished by incorporating into the modem 74 a means for providing short bursts of the carrier frequency, preferably a single sign wave of the carrier frequency, through the high pass filter 118 to the wire 26. This is done repeatedly. One may connect an oscilloscope across the terminals of the modem. The oscilloscope will show the repetitive transmission of the single sign wave of carrier frequency and separate therefrom any echoes received back from the wire 26. Other measuring equipment could be used to look for echoes. The impedance $Z_1$ of network 164 is then adjusted to minimize or eliminate the echoes. When this has been done, the impedance $Z_1$ is approximately equal to the characteristic transmission line impedance of wire 26 (and the ground plane and surrounding dielectric).

The impedance matching network 164 may be located remotely of the modem and loop driver so long as there is a substantially zero impedance between the earth grounds at 160 and at 162. This may be conveniently accomplished by utilizing the metal frame of a building, a water pipe, a conductive stake driven into moist ground or any other appropriate earth ground in accordance with the National Electrical Code.

When the impedance matching network 164 is located adjacent to the modem 74 and loop driver 28, the earth grounds 160 and 162 are identical as indicated by the dotted line 166.

The modem 74 is, of course, connected to a host computer or the like (not shown) for generating the signals to be transmitted by the modem 74. In one embodiment of our invention, we operate the modem 74 at a carrier frequency of approximately 230 kilohertz and a data rate of 18.2 kilobits per second. The loop driver 28 generates a low frequency signal within the range of 0 to 30 kilohertz (typically 5 to 10 kilohertz). The modem carrier frequency could be between approximately 100 and 500 kilohertz so long as the loop driver frequency was substantially below 100 kilohertz. The modem 74 may even be operated over a band of frequencies with the impedance matching network 164 ajusted to the impedance of the guide wire 26 at the center frequency of the band.

Figure 2:
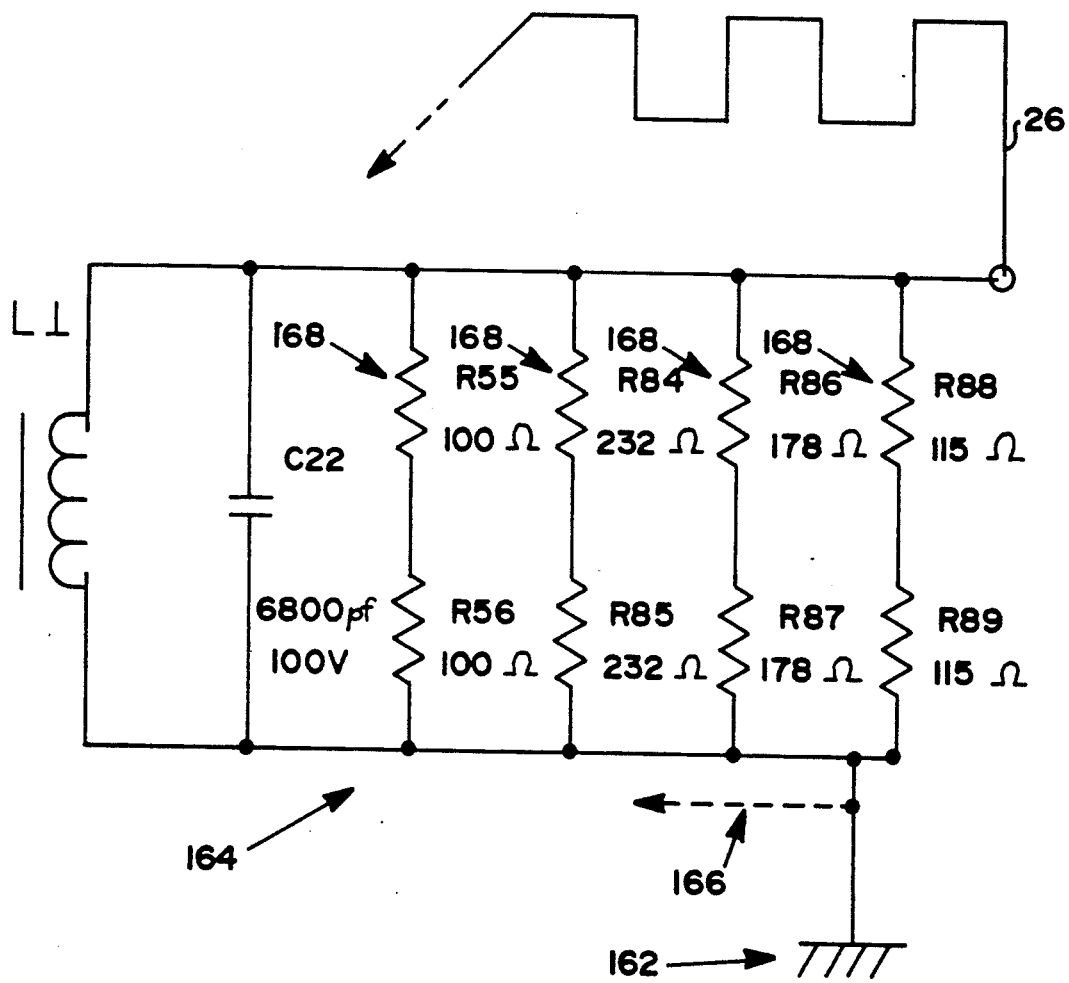
FIG. 2 is a schematic circuit diagram of an impedance matching network according to the invention.

Now referring to FIG. 2, the impedance matching network 164 of the invention may conveniently take the form of an inductor L1 and capacitor C2 connected in parallel between the guidance wire 26 and earth ground 162. A plurality of resistors generally indicated at 168 are connected in parallel with inductor L1 and capacitor C22. The resistance of each of these resistors are shown on the diagram; for example: resistors R55 and R56 are each 100 ohms and resistors R84 and R85 are each 232 ohms.

The network of resistors is designed so that by clipping them out two at a time you can achieve an impedance in relatively small steps from about 50 ohms to about 100 ohms at the carrier frequency.

The inductor L1 is a 71 microHenry choke and capacitor C22 is 100 volt capacitor having a value of 6,800 picoFarads. Alternatively, a variable resistor could be provided for the network 164 or the inductor L1 or capacitor C22, could be variable so long as the goal of matching the impedance $Z_1$ of the network 164 to the wire 26 characteristic impedance at the carrier frequency of the modem 74 is achieved.

Figure 3:
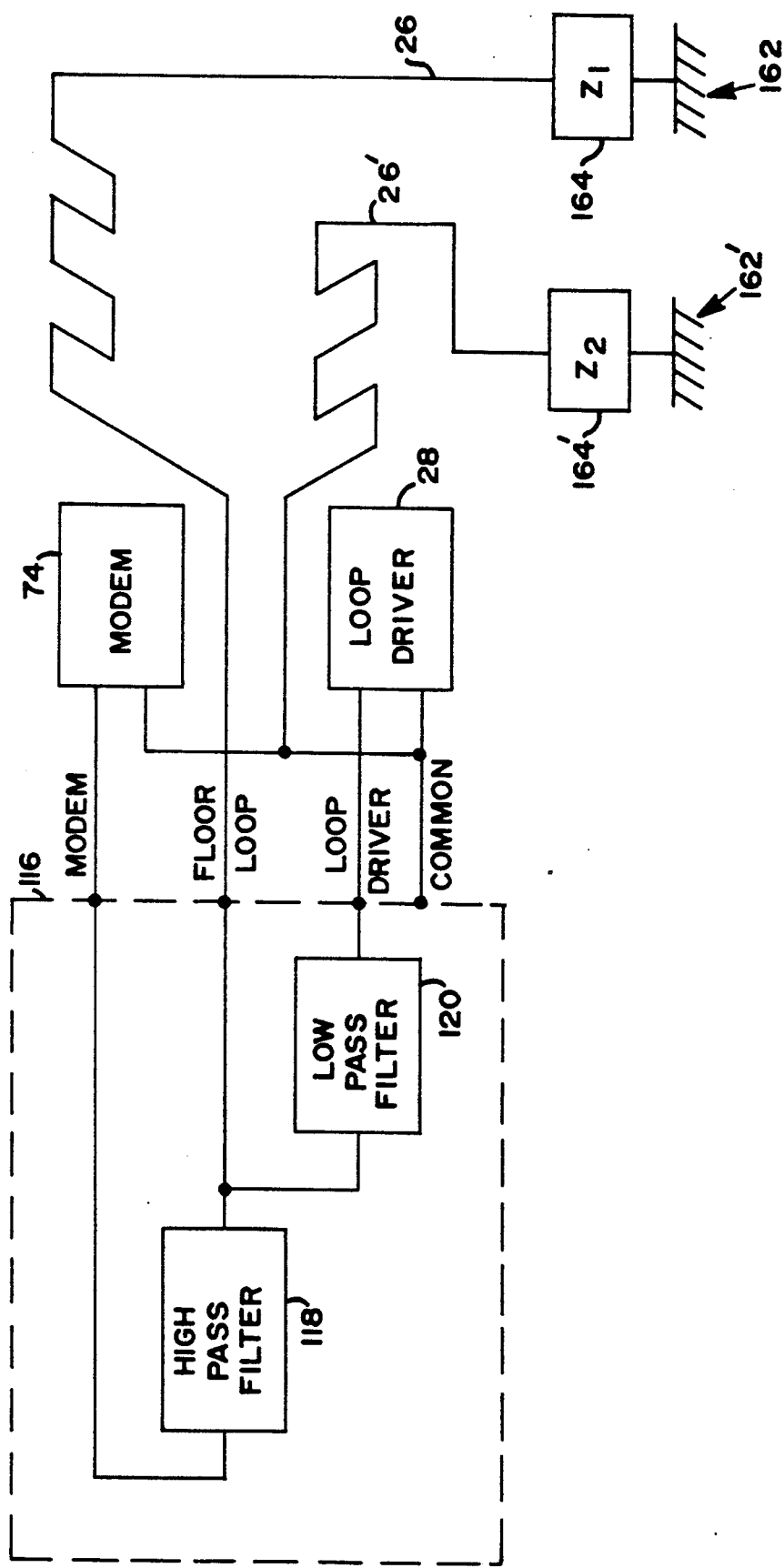
FIG. 3 is a schematic block circuit diagram of an alternative system according to the invention.

An alternative embodiment of the invention is shown in FIG. 3. Here two guide wires 26 and 26' are provided remotely terminated at impedance matching networks 164 and 164' to earth ground at 162 and 162', respectively. The network 164' takes the same form as illustrated for the network 164 in FIG. 2. In order to look for echoes and adjust the impedance $Z_1$ and $Z_2$ of the networks 164 and 164', one connects the oscilloscope between end of the modem terminals connected to each of the respective wires 26 and 26' and earth ground and looks for echoes on the line 26 or 26' to which the oscilloscope is connected while adjusting the respective network 164 or 164'.

It will thus be seen that the objects set forth above, among those made apparent from the preceding description are efficiently attained and since certain changes may be made in the above systems and constructions without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A system for digital communication along a wire for defining the path of wire guided vehicles comprising:
   A) a wire defining said path;
   B) a modem having two terminals for providing high frequency signals, one of said modem terminals connected to one end of said wire and the other of said modem terminals connected to a first earth ground;
   C) a loop driver having two terminals for providing low frequency control signals, one of said loop driver terminals connected to said one end of said wire and the other of said loop driver terminals connected to said first earth ground; and
   D) an impedance matching network having two terminals, one of said network terminals connected to the other end of said wire and the other of said network terminals connected to a second earth ground, said impedance matching network providing an impedance approximately equal to the impedance of said wire at the frequency of said high frequency signals.

2. The system as claimed in claim 1 wherein said network is located adjacent to said modem and said loop driver.

3. The system as claimed in claim 2 wherein said first and said second earth grounds are identical.

4. The system as claimed in claim 1 wherein said network and said second earth ground are located remote from said modem and said loop driver.

5. A system as claimed in claim 1 wherein said modem is adjusted to send a short signal at said high frequency signals on said wire such that echoes of said short signal may be minimized by adjusting the impedance of said impedance matching network.

6. A system as claimed in claim 1 wherein said high frequency signals are at a frequency greater than approximately 100 kilohertz and said low frequency signals are at a frequency substantially less than 100 kilohertz.

7. A system as claimed in claim 1 wherein said high frequency signals are within the range of frequencies between 100 and 500 kilohertz.

8. A system for digital communication along a wire for defining the path of wire guided vehicles comprising:
   A) a wire (26) defining said path;
   B) a modem (74) providing high frequency signals at a first pair of terminals;
   C) a loop driver (28) providing low frequency control signals at a second pair of terminals; and
   D) an impedance matching network (164) connected between one end of said wire and a first earth ground; and a first one of said terminals of each of said pairs of terminals connected to a second earth ground (160), and the second one of said terminals of each of said pairs of terminals connected together and to the other end of said wire, said impedance matching network (164) providing an impedance approximately equal to the impedance of said wire at the frequency of said high frequency signals.

9. The system claimed in claim 8 wherein said impedance matching network comprises an inductor and a capacitor connected in parallel between said one end of said wire and said first earth ground, and a variable resistance means connected in parallel with said capacitor and inductor.

10. The system as claimed in claim 9 wherein said variable resistance means comprises a plurality of resistors connected in parallel whereby by disconnecting selected resistors the impedance of said network is changed.

11. A system as claimed in claim 8 wherein said modem is adjusted to send a short signal at said high frequency signals on said wire such that echoes of said short signal may be minimized by adjusting the impedance of said impedance matching network.

12. The system as claimed in claim 8; and,
   E) a coupling circuit connected to the other end of said wire that is not connected to said impedance matching network and to the second terminals of said modem and said loop driver, and said coupling circuit providing for transmission of said high frequency signals between said modem and said wire and for transmission of said low frequency control signals from said loop driver to said wire without mutual interference.

13. The system as claimed in claim 12 wherein said impedance matching network comprises an inductor and a capacitor connected in parallel between said one end of said wire and said first earth ground, and a variable resistance means connected in parallel with said capacitor and inductor.

14. The system as claimed in claim 13 wherein said variable resistance means comprises a plurality of resistors connected in parallel whereby by disconnecting selected resistors the impedance of said network is changed.

15. A system as claimed in claim 12 wherein said high frequency signals are at a frequency greater than approximately 100 kilohertz and said low frequency signals are at a frequency substantially less than 100 kilohertz.

16. A system as claimed in claim 12 wherein said high frequency signals are within the range of frequencies between 100 and 500 kilohertz.

17. A system for digital communication along a wire for defining the path of wire guided vehicles comprising:
   A) first (26) and second (26') wires, each defining a different portion of the path of the vehicles;
   B) a modem (74) providing high frequency signals to one end of said first wire (26) and to one end of said second wire (26');
   C) a loop driver (28) providing low frequency control signals to said one end of said first wire (26) and said one end of said second wire (26');
   D) a first impedance matching network (164) connected between the other end of said first wire and a first earth ground (162); and
   E) a second impedance matching network (164') connected between the other end of said second wire and a second earth ground (162');
   said impedance matching networks each providing an impedance approximately equal to the impedance of the wire to which it is connected at the frequency of said high frequency signals.

18. A system as claimed in claim 17 wherein said high frequency signals are at a frequency greater than approximately 100 kilohertz and said low frequency signals are at a frequency substantially less than 100 kilohertz.

19. A system as claimed in claim 17 wherein said high frequency signals are within the range of frequencies between 100 and 500 kilohertz.

20. A system as claimed in claim 17 wherein said modem is adapted to send short signals at said high frequency signals on said wires such that echoes of said short signals may be minimized by adjusting the impedance of said impedance matching networks.

* * * * *